Sept. 3, 1968   F. E. WILEY   3,400,186
MAKING PLASTIC FILM FROM PARTICLES
Filed Nov. 18, 1964
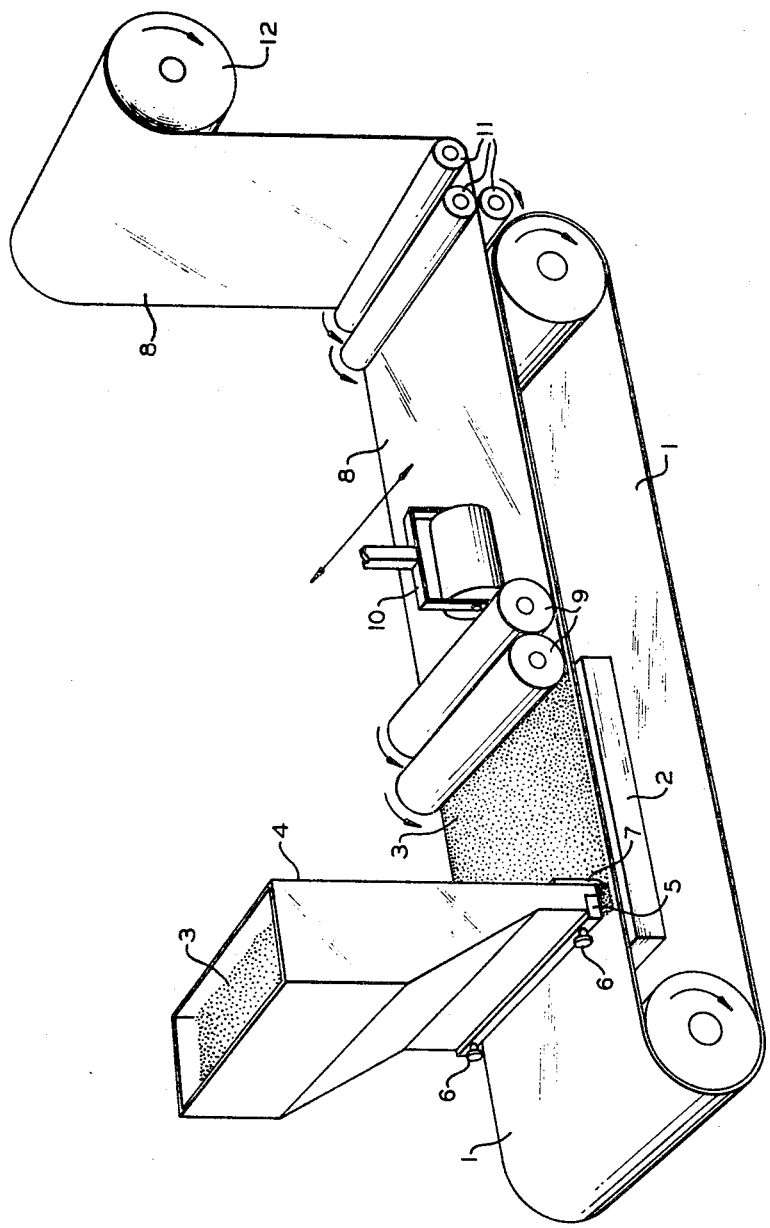
INVENTOR.
F. E. WILEY
BY  *Young & Quigg*
ATTORNEYS United States Patent Office 3,400,186
Patented Sept. 3, 1968

3,400,186
MAKING PLASTIC FILM FROM PARTICLES
Fred E. Wiley, Longmeadow, Mass., assignor to Phillips Petroleum Company, a corporation of Delaware
Filed Nov. 18, 1964, Ser. No. 412,045
8 Claims. (Cl. 264—126)

ABSTRACT OF THE DISCLOSURE

Plastic film and sheet may be produced from particles of polymer by depositing a layer of particles on a hot polished surface, allowing sufficient time for them to reach the fusion temperature and then compacting the layer.

---

This invention relates to the making of thin plastic sheet materials. In one of its aspects it relates to the making of thin plastic sheet materials from finely granulated particles of a thermoplastic material.

The use of thin plastic sheets and thin plastic films is widespread. Various ways of making them are known in the art. Among these are extruding and rolling plastic materials between high pressure rollers. In making thin sheets and films using these conventional forming methods, it is necessary to often blend polymer materials together to obtain a modified polymer material that has suitable properties for conventional processing. This is a time consuming and expenisve process. It is almost impossible to process some polymers by conventional methods without going through the costly and time consuming blending process. Recent developments in polyolefin manufacturing processes have produced particle form polyethylene and powdery polypropylene materials that must be blended with other materials and formed into pellets before it can be processed by conventional means. It is obvious that a practical method of producing thin films and sheet materials directly from the particle form polymers, without intermediate blending, pelleting and handling, would be a valuable contribution to the art.

It is an object of this invention to provide a method for producing thin plastic sheet materials. It is another object of this invention to provide a method for making thin plastic films. It is also an object of this invention to provide a method of making thin plastic sheet materials and plastic films from particle form polymers.

Other aspects, objects and advantages of this invention will be apparent to those skilled in the art upon careful study of the disclosure and the appended claims.

I have discovered a process by which thin plastic sheet materials and thin plastic films can be made from small granulated particles of a thermoplastic material. According to my invention, granulated particles of a thermoplastic material are deposited in a thin uniform layer on a hot polished surface. The hot polished surface heats the particles to their fusion temperature and then the layer is compacted into a thin sheet of plastic by rolling it with heated rollers. The resulting thin sheet of plastic is cooled and then removed from the polished surface. The thin sheet of plastic is clear and has good physical properties making it desirable for use in wrapping and packaging of various objects.

This invention can be used to form thin homogeneous sheets and films up to about 25 mils thick from any thermo plastic material. In its preferred embodiment it is used to produce thin sheets and films from polyethylene and polypropylene polymers having very high inherent viscosities. The thermoplastic material must be in a very fine granulated condition before it is processed according to this invention. The maximum particle size of the thermoplastic material is 10 mils in diameter. The use of larger particles tends to produce a film having small holes and thin spots in its surface. Preferably the particles are no larger than 8 mils in diameter. The particles are easily handled if they are free flowing and without lumps.

The heated polished surface can be made of any suitable material that can be heated to at least the fusion temperature of the thermoplastic material. Preferably the surface will be made of a polished metal sheet because of its flexibility and its good heat conduction properties. By using a thin polished metal sheet disposed on a conveyor belt, this process can be carried out continuously.

The drawing is a side elevation view of an apparatus used in carrying out this process continuously. In the drawing, a thin polished metal sheet is disposed on conveyor belt 1. A large heating element 2 is positioned under the top portion of conveyor belt 1. Heating element 2 extends from one side of conveyor belt 1 to the other to provide even constant heat. As conveyor belt 1 moves over heating element 2 in a clockwise direction, it is heated to the desired temperature. Granulated particles of thermoplastic material 3 are contained in feed hopper 4. As belt 1 moves under feed hopper 4, granulated particles 3 are deposited on belt 1 in a uniform depth. The depth is regulated by adjusting the width of feed slot 5 using screw mechanism 6 in the base of hopper 4. Horizontally mounted scraper bar 7 smooths out the surface of particles 3 into a smooth uniform surface as they move past it. As particles 3 move along with conveyor belt 1 they are heated to their fusion temperature. When the fusion temperature is reached, particles 3 are compacted into a homogeneous sheet 8 by compaction pressure from rollers 9 and 10. Rollers 9 apply compaction pressure along the longitudinal axis of sheet 8 and roller 10 applies compaction pressure along the lateral axis. Roller 10 moves across sheet 8 in a lateral direction to uniformly compact the thermoplastic particles into a uniform homogeneous sheet. A simple carriage apparatus allows roller 10 to move in the longitudinal direction of the film while pressure is applied and then roller 10 can be lifted from the surface of film 8 while roller 10 is returned to its original position and another rolling cycle can be initiated. As sheet 8 moves past roller 10 it is cooled slightly and runs past take up rollers 11. Sheet 8 is then rolled onto roller 12 where it is stored.

The polished metal surface is heated to a temperature above the fusion temperature of the thermoplastic material being processed. The upper limit of the sheet temperature is determined by the temperature at which the plastic material is thermally degraded. An increase in temperature increases the speed at which the plastic sheet material can be made. Preferably the temperature of the polished surface will not be more than 75° F. above the fusion temperature of the plastic material being processed thereby preventing excessive thermal degradation of the plastic material. Heat can be conveniently applied below the surface of the polished sheet with the thermoplastic matterial resting on top of it. The thermoplastic granules are allowed to contact the heated surface until they rise to at least their fushion temperature. When this is achieved, the layer of thermoplastic granules is compacted into a homogeneous sheet by rolling with heated rollers. The rollers are maintained at a temperature at least equal to the fusion temperature of the thermoplastic materials. The upper limit of the roller temperature is also determined by the temperature at which the thermoplastic material is thermally degraded. The pressure of the rollers on the thermoplastic material is only great enough to compact the granules into a homogeneous sheet or film. The pressure of the rollers does not approach the high pressures required to promote internal shearing within the molecular and crystalline structure of the particles. Since the granules are heated to at least their fusion temperature when the rolling takes place, very little pressure must be applied to compact them into a homogeneous sheet. The rollers can be positioned so as to permit rolling along both the longitudinal and lateral axis of the film or sheet. By doing this a more uniform compaction is achieved and the film produced has some degree of orientation along both its axes. This produces a film that is not fibrillatable, thus improving its properties as a wraping and packaging material.

The thermoplastic granules may be deposited on the hot polished surface in a variety of ways. When using a conveyor belt arrangement for continuous operations, as described above, a simple feed hopper with an adjustable slot at its base allows the granules to gravity feed onto the moving belt. The depth of the granules on the belt can be adjusted by adjusting the width of the feed slot. A mechanical shaker arrangement can be used to shake the granules on the metal sheet uniformly. When the process is carried out without a conveyor belt arrangement, granules of the thermoplastic material can be poured directly onto the hot polished surface and after a given time the surface can be inclined so as to allow the unfused granules to pour off the sheet. This leaves a uniform layer of particles adhering to the surface of the heated sheet. Then the granules can be compacted with a roller. The depth of the granules deposited on the sheet will depend on the desired thickness of the product and the size of the particles. The depth of the particles should not exceed 40 mils. Preferably the depth will not exceed 30 mils. The following example illustrates a specific embodiment of the invention.

EXAMPLE

A finely granulated sample of a copolymer of ethylene and butene-1 was obtained by screening small particles of the polymer through sieves of known mesh size. The particles collected for use had a maximum particle size of 4.1 mils. The density of the polymer was 0.945 gram per cubic centimeter and the melt index was too low to measure in accordance with ASTM D-1238-57T, condition E. A polished metal plate was heated to 335° F. A layer of the screened polymer granules was leveled on the hot polished plate and allowed to heat for 30 seconds. Then the excess unfused powder was shaken from the surface. The fused plastic layer was rolled 4 times using a 1 5/16 inch diameter tube heated to 300° F. The resulting film was 18.2 mils thick. A die-cut tensile specimen was tested after conditioning in standard laboratory atmosphere for 48 hours at a cross-heat rate of 1 inch per minute with 0.9 inch clamp spacing and 0.5 inch gauge length and 0.185 inch width. Results were 2580 p.s.i. yield stress, 2880 p.s.i. tensile stress and 520 percent elongation.

It will be apparent to those skilled in the art upon studying the disclosure and appended claims that many modifications, changes and alterations are possible without departing from the spirit and scope of this invention.

I claim:

1. A method of making thin plastic sheet materials up to about 25 mils thick which comprises depositing finely granulated particles of a thermoplastic material on a heated polished surface in a uniform thickness; said heated polished surface being maintained at a temperature slightly above the fusion temperature of said thermoplastic material; heating said finely granulated particles of thermoplastic material to their fusion temperature by contacting them with said heated polished surface; compacting said finely granulated particles of thermoplastic material into a thin plastic sheet by rolling with multiple rollers; said rollers being maintained at a temperature about equal to the fusion temperature of said thermoplastic material; said rolling being along more than one axis on the sheet; cooling said thin sheet of plastic material; and removing said thin sheet of plastic material from said polished surface.

2. The method according to claim 1 wherein said polished surface is a metal sheet.

3. The method according to claim 1 wherein said thermoplastic material is a copolymer of ethylene and butene-1.

4. The method according to claim 1 wherein said thermoplastic material is polypropylene.

5. The method according to claim 1 wherein said thermoplastic material is polyethylene.

6. A method of making plastic film which comprises depositing granulated particles of a copolymer of ethylene and butene-1 of less than 10 mils in diameter on a heated polished metal sheet; said particles being evenly distributed over said sheet at a depth of about 30 mils; said polished metal sheet being maintained at about 335° F.; heating said granulated particles to their fusion temperature on said polished metal sheet; compacting said granulated particles into a thin film of less than 20 mils thickness by rolling with multiple rollers; said rollers being maintained at a temperature of about 300° F.; said rolling being along the longitudinal axis and along the lateral axis of said film; cooling said film; and removing said film from said polished metal sheet.

7. A method of making polypropylene film which comprises depositing granulated particles of polypropylene of less than 10 mils in diameter on a heated polished metal sheet; said particles being evenly distributed over said sheet at a depth of not more than about 30 mils; said polished metal sheet being maintained at about 375 F.; heating said granulated particles to their fusion temperature on said polished metal sheet; compacting said granulated particles into a thin film of less than 20 mils thickness by rolling with one or more rollers; said rollers being maintained at a temperature of about 340° F.; said rolling being along the longitudinal axis and along the lateral axis of said film; cooling said film; and removing said film from said polished metal sheet.

8. A method of making polyethylene film which comprises depositing granulated particles of polyethylene of less than 10 mils in diameter on a heated polished metal sheet; said particles being evenly distributed over said sheet at a depth of about 30 mils; said polished metal sheet being maintained at about 335° F.; heating said granulated particles to their fusion temperature on said polished metal sheet; compacting said granulated particles into a thin film of less than 20 mils thickness by rolling with one or more rollers; said rollers being maintained at a temperature of about 300° F.; said rolling being along the longitudinal axis and along the lateral axis of said film; cooling said film; and removing said film from said polished metal sheet.

References Cited

UNITED STATES PATENTS

| | | | |
|---|---|---|---|
| 2,736,925 | 3/1956 | Heisler et al. | 264—126 X |
| 2,960,727 | 11/1960 | Bradshaw et al. | 264—126 |

FOREIGN PATENTS

| | | |
|---|---|---|
| 187,302 | 12/1955 | Austria. |

JAMES A. SEIDLECK, *Primary Examiner.*

P. E. ANDERSON, *Assistant Examiner.*